United States Patent [19]

De Clercq et al.

[11] Patent Number: 4,976,888

[45] Date of Patent: Dec. 11, 1990

[54] ANTIFOAM BASED ON OIL-IN-WATER EMULSION

[75] Inventors: Arnold De Clercq, Dirmstein; Wolfram Bergold, Heidelberg; Hans-Juergen Degen, Lorsch; Jaroslav Melzer, Ludwigshafen, all of Fed. Rep. of Germany

[73] Assignee: BASF Aktiengesellschaft, Ludwigshafen, Fed. Rep. of Germany

[21] Appl. No.: 292,332

[22] Filed: Dec. 30, 1988

[30] Foreign Application Priority Data

Dec. 31, 1987 [DE] Fed. Rep. of Germany ....... 3744593

[51] Int. Cl.$^5$ ............................................. B01D 19/04
[52] U.S. Cl. ..................................... 252/358; 252/321
[58] Field of Search ................................ 252/358, 321

[56] References Cited

U.S. PATENT DOCUMENTS

| | | | |
|---|---|---|---|
| 4,009,119 | 2/1977 | Poschmann et al. | 252/358 |
| 4,514,319 | 4/1985 | Kulkarni | 252/321 |
| 4,626,377 | 12/1986 | Kavchok et al. | 252/321 |
| 4,631,273 | 12/1986 | Blehm et al. | 514/29 |
| 4,664,844 | 5/1987 | Bergold et al. | 252/358 |

Primary Examiner—John M. Ford
Assistant Examiner—Catherine Scalzo
Attorney, Agent, or Firm—Oblon, Spivak, McClelland, Maier & Neustadt

[57] ABSTRACT

In antifoams based on oil-in-water emulsions, the oil phase of the emulsions contains (a) a $C_{12}$–$C_{26}$-alcohol, a distillation residue which is obtainable in the preparation of alcohols having a relatively large number of carbon atoms by the oxo process or by the Ziegler process and which may furthermore be oxyalkylated and/or (b) a fatty acid ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms, accounts for from 5 to 50% by weight of the emulsion and has a mean particle size of less than 25 μm, and from 5 to 50% by weight of components (a) and (b) of the oil phase are replaced by (d) one or more compounds which melt at above 70° C. and are selected from the group consisting of the fatty alcohols of not less than 28 carbon atoms, the esters of a $C_1$–$C_{22}$-carboxylic acid with an alcohol of not less than 28 carbon atoms, the polyethylene waxes having a molecular weight of not less than 2,000, the carnauba waxes, the montan ester waxes and the montanic acid waxes and their salts.

10 Claims, No Drawings

ANTIFOAM BASED ON OIL-IN-WATER EMULSION

U.S. Pat. No. 4,009,119 discloses a process for defoaming aqueous systems using emulsion which contain $C_{12}$–$C_{22}$-alkanols and/or $C_{12}$–$C_{22}$-fatty acid esters of dihydric or trihydric alcohols, and liquid paraffin and/or $C_{12}$–$C_{22}$-fatty acids as antifoams and surfactants, added in conventional amounts, as emulsifiers. The emulsified water-insoluble substances have a mean particle size of from 4 to 9 μm. The known antifoam emulsions have the disadvantage that they cream during storage and in some cases even thicken to such an extent that they can no longer be pumped.

U.S. Pat. No. 4,664,844 discloses that antifoams based on oil-in-water emulsions, in which the oil phase of the emulsion contains (a) a $C_{12}$–$C_{26}$-alcohol, a distillation residue which has been obtained in the preparation of alcohols having a relatively large number of carbon atoms by the oxo process or by the Ziegler process and which may furthermore be alkylated and/or (b) a fatty acid ester of a $C_{12}$–$C_{22}$-carboxylic acid with a monohydric to trihydric $C_{12}$–$C_{18}$-alcohol and, if required, (c) a hydrocarbon having a boiling point above 200° C. or a fatty acid of 12 to 22 carbon atoms, accounts for from 15 to 60% by weight of the emulsion and has a mean particle size of from 0.5 to 15 μm, can be stabilized to prevent increasing viscosity and creaming during storage by adding from 0.05 to 0.5% by weight of a high molecular weight, water-soluble homopolymer or copolymer of acrylic acid, methacrylic acid, acrylamide or methacrylamide.

Antifoams based on oil-in-water emulsions, which are conventionally used in papermaking, are known to become less effective if the temperature of the aqueous system to be defoamed increases above 35° C. At temperatures above 50° C., an even more rapid decrease in the effectiveness of the antifoam occurs when the known oil-in-water emulsions are used. Since there is an increasing tendency for water circulations in the paper mills to be closed ones, the result is that the temperature of the water conveyed in the circulation increases during papermaking, so that the effectiveness of the antifoams used to date decreases substantially.

It is an object of the present invention to provide antifoams which retain their effectiveness even at above 35° C. or do not lose their effectiveness to the same extent as the known antifoams.

We have found that this object is achieved, according to the invention, by antifoams based on an oil-in-water emulsion, in which the oil phase of the emulsion contains (a) a $C_{12}$–$C_{26}$-alcohol, a distillation residue which is obtainable in the preparation of alcohols having a relatively large number of carbon atoms by the oxo process or by the Ziegler process and which may furthermore be oxyalkylated and/or (b) a fatty acid ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms, accounts for from 5 to 50% by weight of the emulsion and has a mean particle size of <25 μm, if from 5 to 50% by weight of components (a) and (b) of the oil phase of the oil-in-water emulsion are replaced by (d) one or more compounds which melt at above 70° C. and are selected from the group consisting of the fatty alcohols of not less than 28 carbon atoms, the esters of a $C_1$–$C_{22}$-carboxylic acid with an alcohol of not less than 28 carbon atoms, the adducts of $C_2$–$C_4$-alkylene oxides with alcohols of not less than 28 carbon atoms, the polyethylene waxes having a molecular weight of not less than 2,000, the carnauba waxes, the montan ester waxes and the montanic acid waxes and their salts.

Component (a) of the oil-in-water emulsions consists in particular of natural or synthetic alcohols of 12 to 26 carbon atoms or alcohol mixtures. Examples are myristyl alcohol, cetyl alcohol and stearyl alcohol. The synthetic alcohols, which are obtainable, for example, by the Ziegler process by oxidation of aluminum alkyls, are saturated, straight-chain alcohols. Synthetic alcohols are also obtained by the oxo process. These are, as a rule, alcohol mixtures. Distillation residues which are obtained in the preparation of the abovementioned alcohols by the abovementioned synthesis or by the Ziegler process can also be used as component (a). Other suitable components (a) of the oil phase of the antifoam emulsions are oxyalkylated distillation residues which can be prepared in the abovementioned process for the preparation of higher alcohols by the oxo synthesis or by the Ziegler process. The said distillation residues are obtained by reacting the abovementioned distillation residues with ethylene oxide or with propylene oxide or with a mixture of ethylene oxide or propylene oxide. Up to 5 ethylene oxide or propylene oxide groups, preferably 1 or 2 ethylene oxide groups, are added per OH group of the alcohol in the distillation residue.

Fatty acid esters of a $C_{12}$–$C_{22}$-carboxylic acid with monohydric to trihydric $C_1$–$C_{18}$-alcohol are used as component (b) of the oil phase of the antifoam emulsion. The fatty acids on which the esters are based are, for example, lauric acid, myristic acid, palmitic acid, stearic acid, arachidic acid and behenic acid. Palmitic acid or stearic acid is preferably used. Monohydric $C_1$–$C_{18}$-alcohols can be used for esterifying the stated carboxylic acids, for example methanol, ethanol, propanol, butanol, hexanol, decanol and stearyl alcohol, as well as dihydric alcohols, such as ethylene glycol, or trihydric alcohols, such as glycerol. The polyhydric alcohols may be completely or partially esterified.

The oil phase of the emulsion may additionally be formed by a further class of water-insoluble compounds, which is referred to below as component (c). The compounds of component (c) can account for up to 50% by weight, based on the components (a) and (b), of the oil phase of the antifoam emulsions. They can be added either to a mixture of components (a) and (b) or to any of the compounds stated under (a) or (b). Suitable components (c) are hydrocarbons having a boiling point of more than 200° C. under 1,013 mbar and a setting point of less than 0° C. and fatty acids of 12 to 22 carbon atoms. Preferred hydrocarbons are liquid paraffins, such as the usual commercial paraffin mixtures, which are also referred to as white oil.

According to the invention, from 5 to 50% by weight of the components (a) and (b) of the oil phase of the oil-in-water emulsions are replaced by a group of compounds which melt at above 70° C. This group of compounds includes fatty alcohols of not less than 28 carbon atoms, esters of a $C_1$–$C_{22}$-carboxylic acid with an alcohol of not less than 28 carbon atoms, adducts of $C_2$-$C_4$-alkylene oxides with alcohols of not less than 28 carbon atoms, polyethylene waxes having a molecular weight of not less than 2,000, montan ester waxes and montanic acid waxes and their salts, in particular the amine salts, which are derived from amines, such as diethylethanolamine, 3-methoxypropylamine, morpholine, diethanolamine and triethanolamine, and carnauba wax having a melting point of not less than 70° C. Montan ester waxes, montanic acid waxes and carnauba waxes are commercial products (cf. Ullmanns Encyklopädie der technischen Chemie, 4th Edition, Volume 24, 1–49, 1983).

Fatty alcohols of not less than 28 carbon atoms are likewise commercially available and are monohydric alcohols. Commercial examples are fatty alcohols of 28 to 48 carbon atoms. Fatty alcohols which contain a substantially larger number of carbon atoms in the molecule can of course also be used as component (d) of the antifoam. Other suitable components (d) are alkylene oxide adducts of the alcohols of not less than 28 carbon atoms. These adducts are obtained by reacting these alcohols with ethylene oxide, propylene oxide and/or butylene oxides. Up to 100 alkylene oxide units may be added per mole of alcohol. The alkylene oxide adducts preferably used are the reaction products of alcohols of not less than 28 carbon atoms with ethylene oxide in a molar ratio of 1:5 to 1:80.

The fatty alcohols of not less than 28 carbon atoms can also be used in the form of esters with $C_1$-$C_{22}$-carboxylic acids as component (d) of the antifoam. Examples of carboxylic acids which are suitable for esterifying the alcohols are formic acid, acetic acid, propionic acid, palmitic acid and stearic acid. Another group of suitable compounds (d) are polyethylene waxes having a molecular weight of not less than 2,000, preferably from 2,500 to 10,000. These polyethylene waxes have a melting point (monoscope) of, preferably, higher than 90° C. They are prepared, for example, by polymerization of ethylene under high pressures in the presence of initiators and polymerization regulators.

Components (a) and (b) can be used in any ratio for the preparation of the antifoams. Each of these two components alone or a mixture of these two components can form the oil phase of the antifoam. For example, mixtures of (a) and (b) which contain from 40 to 60% by weight of component (a) and from 60 to 40% by weight of component (b) have proven particularly suitable in practice. The oil phase of the oil-in-water emulsions may additionally contain one or more compounds of the group (c). However, it is essential that the oil phase of the oil-in-water emulsions contains one or more compounds of group (d). This means that the oil phase of the antifoam emulsions must contain one of the following mixtures: (a) and (d), (b) and (d) or (a), (b) and (d). The compounds of component (c) can, if required, be used in all three of the above possible compositions of the oil phase. Component (d) replaces from 5 to 50, preferably from 10 to 35, % by weight of components (a) and (b) of the oil phase of the oil-in-water emulsions, so that from 95 to 50, preferably from 90 to 65, % by weight of the oil phase consist of the components (a), (b) and, if required, (c). The total oil phase accounts for from 5 to 50% by weight of the oil-in-water emulsions, while the proportion of the aqueous phase in the said emulsions is from 95 to 50% by weight, the percentages by weight summing to 100 in each case.

Preferably used components (d) are $C_{28}$-$C_{48}$-alcohols, adducts of ethylene oxide with $C_{28}$-$C_{48}$-alcohols, polyethylene waxes having a molecular weight of from 2,500 to 10,000 and mixtures of the stated compounds. The novel antifoams are preferably prepared by initially melting the compounds of component (d) with the compounds of component (a) and/or (b) and, if required, (c) and then emulsifying the resulting melt in water. In order to obtain a homogeneous melt from the abovementioned components, it is often necessary to employ melt temperatures of above 100° C. The mixtures (a) to (d) are usually melted at from 50° to 140° C.

To emulsify the oil phase in the aqueous phase, the customary surfactants are used, these surfactants having an HLB of more than 6. These surfactants are oil-in-water emulsifiers or typical wetting agents. Among the surfactants, anionic, cationic or nonionic compounds can be used. Anionic or nonionic surfactants or mixtures of anionic and nonionic surfactants are preferably used. Substances of the stated type are, for example, sodium salts or ammonium salts of higher fatty acids, such as ammonium oleate or stearate, oxyalkylated alkylphenols, such as nonylphenol or isooctylphenol, which are reacted with ethylene oxide in a molar ratio of from 1:2 to 1:50, oxyethylated unsaturated oils, for example the reaction products of 1 mole of castor oil and from 30 to 40 moles of ethylene oxide, or the reaction products of 1 mole of sperm oil alcohol with from 60 to 80 moles of ethylene oxide. Other preferably used emulsifiers are sulfated oxyethylation products of nonylphenol or octyphenol, which are in the form of the sodium salt or ammonium salt of the corresponding sulfuric half ester. 100 parts by weight of the oil-in-water emulsions usually contain from 0.5 to 5 parts by weight of an emulsifier or of an emulsifier mixture. The major part of the emulsifier is dissolved in the aqueous phase.

In addition to the abovementioned emulsifiers, it is also possible to use protective colloids, such as high molecular weight polysaccharides and soaps, or other conventional additives, such as stabilizers (cf. U.S. Pat. No. 4,664,844). The addition of from 0.05 to 0.5% by weight, based on the total emulsion, of high molecular weight, water-soluble homopolymers and copolymers of acrylic acid, methacrylic acid, acrylamide or methacrylamide as a stabilizer has proven particularly useful. Emulsification of the oil phase (mixture of the components (a) to (d) can be effected using a commercial apparatus, for example a disperser.

The resulting oil-in-water emulsions have a viscosity of from 300 to 3,000 mPa.s immediately after preparation and their oil phase has a mean particle size of less than 25 $\mu$m, preferably from 0.5 to 15 $\mu$m.

Although the compounds of component (d), alone or as a mixture with component (c), are not effective as antifoams for oil-in-water emulsions, the use of one or more compounds of component (d) together with compounds of component (a) and/or (b) surprisingly results in a synergistic effect. The addition of component (d) to the oil phase of antifoams which contain components (a) and/or (b) in emulsified form causes little or no deterioration in the effectiveness of the resulting antifoams at relatively low temperatures but produces an unexpectedly great increase in the effectiveness of these antifoams in aqueous systems which are at above 35° C. The novel antifoams based on oil-in-water emulsions can therefore be used in particular in aqueous systems in which it is necessary to control the formation of foam at relatively high temperatures, for example in closed paper machine circulations, in pulp cooking and in milling and dispersing of paper stock and pigments for papermaking.

The novel oil-in-water emulsions are used as antifoams in foam-forming aqueous systems in an amount such that about 0.02–0.5, preferably 0.05–0.3, part by weight of the antifoam emulsion is present per 100 parts by weight of a foam-forming medium. The novel antifoam emulsions are used in particular as antifoams in papermaking, and are employed both in the cooking of sulfite pulp and in papermaking (addition to the paper stock) and paper coating (addition to the coating slips). The antifoams can also be used for controlling foam in the food industry, in the starch industry and in wastewater treatment plants.

In the Examples, parts and percentages are by weight. The mean particle size of the particles of the oil phase emulsified in water was determined with the aid of a Coulter counter. The molecular weights of the waxes were determined by viscometry. The K value of the polymers was determined according to H. Fikentscher, Cellulosechemie, 13 (1932), 58–64 and 71–74, at 25° C. in 5% strength aqueous sodium chloride solution at a polymer concentration of 0.1% by weight; $K = k \cdot 10^3$. Determination of the foam number:

In each case 5l of a foam-producing paper stock suspension are circulated for 5 minutes in a channel consisting of a transparent plastic. The amount of foam formed at the surface of the stock suspension is then measured in area units (cm$^2$) with the aid of a grid on the wall of the channel and is expressed as a foam number for evaluating the effectiveness of an antifoam.

If the paper stock suspension is circulated in the absence of an antifoam, the foam number after 5 minutes is 1,200 cm$^2$. By adding 2 mg/l of an effective antifoam (a total of 10 mg, based on solids) in each case to the paper stock suspension, this foam number is substantially reduced, so that it is a measure of the effectiveness of an antifoam. Testing the antifoams:

The temperature of the paper suspension is 20° C., 50° C. or 60° C., depending on the test. When the warmer stock suspension is used, a foam channel with airinsulated walls is employed. The temperature of the stock suspension is kept constant by means of an immersion heater connected to a controller. The temperature of the suspension remains constant at, for example, 50±1° C. during the test.

Since the zero foam numbers at 20° C., 50° C. and 60° C. are different, the effectiveness of an antifoam is expressed in terms of % of residual foam.

The % of residual foam (R) is calculated as $$R = \frac{S_e \cdot 100}{S_o}$$

where $S_e$ is the foam number measured after the addition of an antifoam and $S_o$ is the zero foam number, ie. the number measured in the absence of an antifoam. In this terminology, the smaller the R the better the antifoam.

EXAMPLE 1

An oil-in-water antifoam emulsion in which the oil phase accounts for 30% by weight of the emulsion and has a mean particle size of from 2 to 5 μm is prepared using a disperser.

The oil phase consists of the following components:
(a) 23.5 parts of a mixture of $C_{16}$–$C_{20}$-fatty alcohols,
(b) 2.0 parts of glycerol triesters of $C_{16}$–$C_{18}$-fatty acids,
(c) 2.0 parts of a mineral oil (commercial white oil) and
(d) 2.5 parts of a mixture of $C_{28}$–$C_{32}$-fatty alcohols.

The water phase consists of:
65.6 parts of water,
3.5 parts of an emulsifier which is obtainable by an addition reaction of 25 moles of ethylene oxide with 1 mole of isooctylphenol and esterification of the adduct with sulfuric acid to give the half ester,
0.7 part of a copolymer of 70% of acrylamide and 30% of acrylic acid, having a K value of 270, and
0.2 part of sodium hydroxide solution.

Components (a) to (d) were initially heated to 110° C. and then added to the aqueous phase with dispersing. The oil-in-water emulsion thus obtained has a viscosity of 1,950 mPa.s at 20° C. immediately after the preparation. The effectiveness of this antifoam emulsion is tested on a paper stock, as described above. The following results are obtained for the residual foam number R in % at the temperatures used in each case for the paper stock:

| T (°C.) | R [%] |
| --- | --- |
| 20 | 24 |
| 50 | 15 |
| 60 | 30 |

COMPARATIVE EXAMPLE 1

An oil-in-water emulsion is prepared by the method stated in Example 1, except that component (d) is omitted and the amount of the fatty alcohol mixture of component (a) is increased to 26 parts. An antifoam emulsion whose viscosity immediately after the preparation is 600 mPa.s at 20° C. is obtained. When this emulsion is tested, the following residual foam numbers in percent are obtained for the temperatures of the paper stock which are stated in the Table.

| T (°C.) | R [%] |
| --- | --- |
| 20 | 16 |
| 50 | 40 |
| 60 | 57 |

If these values are compared with the residual foam according to Example 1, it is seen that the foam number of the comparative emulsion at 20° C. is somewhat better than that of the antifoam emulsion according to Example 1. However, if the temperature of the paper stock suspension is increased to 50° C. or 60° C. in the test, the superiority of the antifoam according to Example 1 over the antifoams according to Comparative Example 1 becomes clearly evident. At 60° C., the antifoam according to antifoam 1 is virtually twice as effective as the antifoam according to Comparative Example 1.

EXAMPLE 2

To prepare an oil-in-water antifoam, the following qualitative composition of compounds was chosen:

(a) mixture of $C_{16}$–$C_{20}$-fatty alcohols,
(b) glycerol triesters of $C_{16}$–$C_{18}$-fatty acids,
(c) commercial white oil and
(d) commercial mixture of $C_{28}$–$C_{38}$-fatty alcohols.

The quantitative composition of the oil phase of components (a) to (d) is shown in Table 1. The mixtures of components (a) to (d) were melted at 110° C. and then dispersed in the water phase stated in Example 1 so that an oil-in-water emulsion containing 31% of oil phase was obtained. The mean particle size of the dispersed oil particles in the emulsion was 2–3 μm. The antifoams 2.1 to 2.4 were tested by the method described above. The R numbers determined are summarized in Table 1 for the individual antifoams.

TABLE 1

| Oil phase of antifoam | Parts (a) | (b) | (c) | (d) | % by weight of (d), based on (a) + (b) | Residual foam R % at 20° C. | 50° C. |
|---|---|---|---|---|---|---|---|
| 2.1 | 24.75 | 3 | 2 | 1.25 | 4.5 | 31 | 23 |
| 2.2 | 21.00 | 3 | 2 | 5.00 | 20.8 | 58 | 16 |
| 2.3 | 18.50 | 3 | 2 | 7.50 | 34.9 | 89 | 23 |
| 2.4 | 13.50 | 3 | 2 | 12.50 | 75.8 | 85 | 66 |

Antifoam 2.4 is a Comparative Example

EXAMPLE 3

Two oil-in-water emulsions are prepared by the method stated in Example 1, the aqueous phase in Example 1 remaining unchanged and the oil phase of the antifoam 3.1 having the following composition:

(a) 24.75 parts of a mixture of $C_{16}$–$C_{20}$-fatty alcohols,
(b) 2.0 parts of a glycerol triester of a $C_{16}$–$C_{18}$-fatty acid,
(c) 2.00 parts of a mineral oil (commercial white oil) and
(d) 1.25 parts of a commercial $C_{34}$–$C_{42}$-fatty alcohol mixture.

The antifoam 3.2 differs from the antifoam 3.1 only in that the same amount of a $C_{44}/C_{42}$-fatty alcohol mixture is used as component (d). The emulsion 3.1 had a viscosity of 2,400 mPa.s immediately after the preparation, while the emulsion 3.2 had a viscosity of 2,800 mPa.s (measured in each case at 20° C.). Both emulsions had a particle size of from 2 to 5 μm.

In order to demonstrate the effectiveness of the two emulsions, the foam numbers were measured in each case by the above method at 20° C. and 50° C., and the residual foam R was determined from the said foam numbers. The results are summarized in Table 2.

TABLE 2

| T (°C.) | R [%] for the antifoams 3.1 | 3.2 |
|---|---|---|
| 20 | 27 | 35 |
| 50 | 14 | 13 |

EXAMPLE 4

A mixture of
(a) 23.5 parts of a mixture of $C_{16}$–$C_{20}$-fatty alcohols,
(b) 2.0 parts of glycerol triester of a $C_{16}$–$C_{18}$-fatty acid,
(c) 2.0 parts of a mineral oil (commercial white oil) and
(d) 2.5 parts of a polyethylene wax having a molecular weight of 6,000 and a melting point of about 100° C. is melted at 110° C. and emulsified in the aqueous phase described in Example 1. The proportion of the oil phase in the resulting oil-in-water emulsion is 31%. Immediately after the preparation, the said emulsion has a viscosity of 2,240 mPa.s and a particle size of 2–5 μm. In order to evaluate the effectiveness of this oil-in-water emulsion as an antifoam, the foam numbers are measured at 20° C. and 50° C. and converted into the residual foam number R. The residual foam number R is 18% at 20° C. and 10% at 50° C. This means that the effectiveness of the oil-in-water emulsion is substantially better at higher temperatures than at room temperature.

We claim:
1. An antifoam oil-in-water emulsion, which consists essentially of water and an oil phase wherein said oil phase consists of from 95 to 50% by weight of
    (a) a $C_{12}$–$C_{26}$-alcohol, a distillation residue which is obtainable in the preparation of alcohols having a relatively large number of carbon atoms by the oxo process or by the Ziegler process and which may furthermore be oxyalkylated,
    (b) a fatty acid ester of a $C_{12}$–$C_{22}$-carboxylic acid with a monohydric to trihydric $C_1$–$C_{18}$-alcohol, or a mixture thereof, and
from 5 to 50% by weight of
    (d) one or more components which melt at above 70° C. and are selected from the group consisting of the fatty alcohols of not less than 28 carbon atoms, the esters of $C_1$–$C_{22}$-carboxylic acid with an alcohol of not less than 28 carbon atoms, the adducts of $C_2$–$C_4$-alkylene oxide with alcohols of not less than 28 carbon atoms,
wherein said oil phase has a mean particle size of <25 μm.

2. An antifoam oil-in-water emulsion, which consists essentially of water and an oil phase wherein said oil phase consists of from 95 to 50% by weight of
    (a) a $C_{12}$–$C_{26}$-alcohol, a distillation residue which is obtainable in the preparation of alcohols having a relatively large number of carbon atoms by the oxo process or by the Ziegler process and which may furthermore be oxyalkylated,
    (b) a fatty acid ester of a $C_{12}$–$C_{22}$-carboxylic acid with a monohydric to a trihydric $C_{12}$–$C_{18}$-alcohol, or a mixture thereof, and
from 5 to 50% by weight of
    (d) one or more components which melt at above 70° C. and are selected from the group consisting of the polyethylene waxes having a molecular weight of not less than 2000, the carnauba waxes, the montan ester waxes and the montanic acid waxes and their salts,
wherein said oil phase has a mean particle size of <25 μm 3. The antifoam oil-in-water emulsion of claim 1 wherein a hydrocarbon having a boiling point above 200° C. or a fatty acid of 12–22 carbon atoms is added.

4. The antifoam oil-in-water emulsion of claim 2 wherein a hydrocarbon having a boiling point above 200° C. or a fatty acid of 12–22 carbon atoms is added.

5. The antifoam of claim 1, wherein a $C_{28}$–$C_{48}$-alcohol, an adduct of ethylene oxide with a $C_{28}$–$C_{24}$-alcohol or a mixture thereof is used as component (d).

6. The antifoam of claim 2, wherein a polyethylene wax having a molecular weight of from 2,500–10,000 is used as component (d).

7. The antifoam of claim 1, wherein a $C_{12}$–$C_{26}$-alcohol is used as component (a) of the oil phase and the oil phase of the oil-in-water emulsion contains one or more compounds which melt at above 70° C. and are selected from the group consisting of the fatty alcohols of not less than 28 carbon atoms, the esters of a $C_1$–$C_{22}$-carboxylic acid with an alcohol of not less than 28 carbon atoms, the adducts of from 5 to 80 moles of ethylene oxide with one mole of an alcohol of not less than 28 carbon atoms in an amount of from 5 to 50% by weight.

8. The antifoam of claim 2, wherein a $C_{12}$–$C_{26}$-alcohol is used as component (a) in the oil phase and the oil phase of the oil-in-water emulsion contains one or more components which melt at above 70° C. and are selected from the group consisting of the polyethylene waxes having a molecular weight of not less than 2,000, the carauba waxes, the montan ester waxes, the montanic acid waxes and their salts, in an amount of from 5 to 50% by weight.

9. The antifoam of claim 1, wherein the oil phase contains from 10–35% by weight of one or more compounds of component (d).

10. The antifoam of claim 2, wherein the oil phase contains from 10–35% by weight of one or more compounds of component (d).

* * * * *